Nov. 18, 1924.
M. ALLISON
1,515,987
DEVICE FOR MARKING ATHLETIC FIELDS
Filed Sept. 17, 1923   2 Sheets-Sheet 1
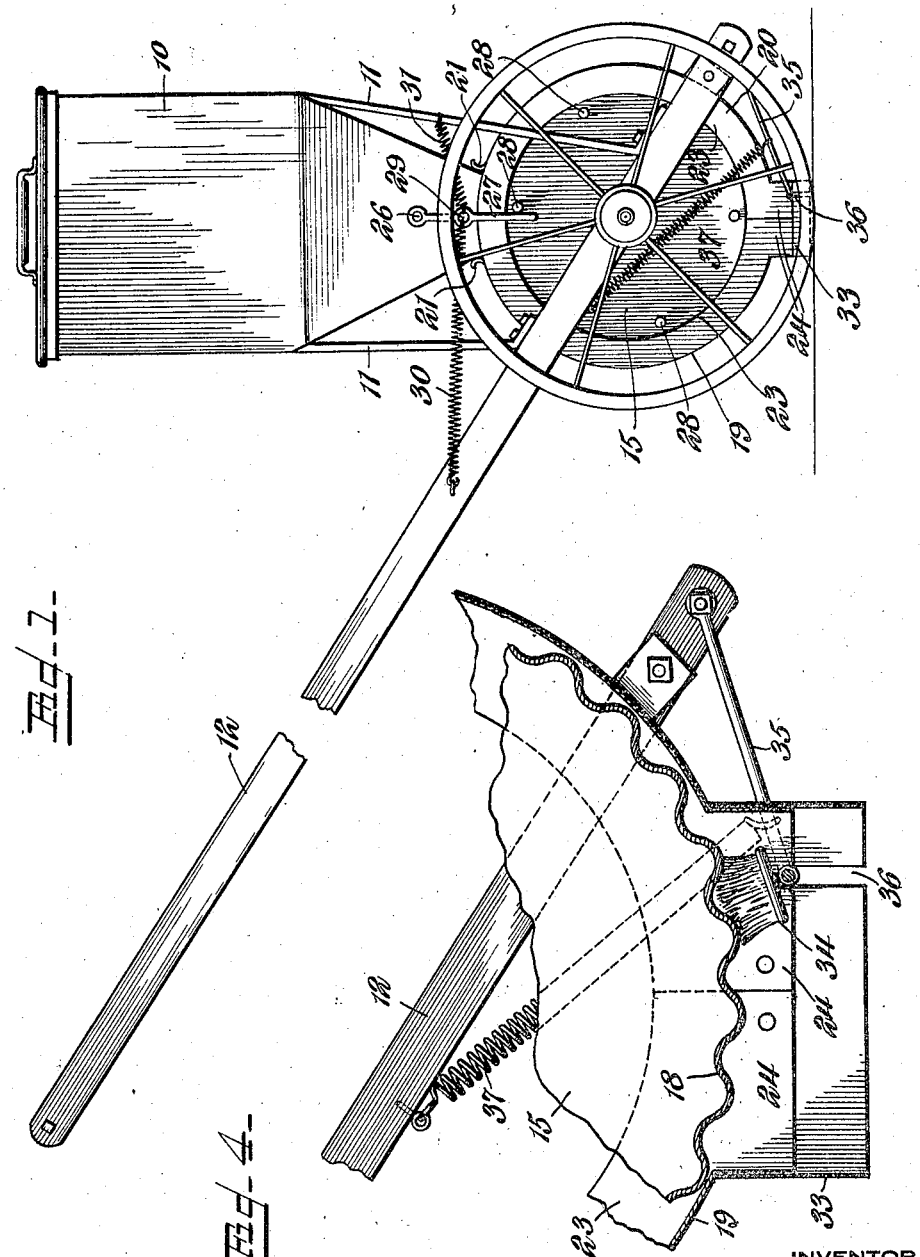
INVENTOR
Melvin Allison
WITNESSES
BY
ATTORNEY Nov. 18, 1924.  
M. ALLISON  
1,515,987  
DEVICE FOR MARKING ATHLETIC FIELDS  
Filed Sept. 17, 1923   2 Sheets-Sheet 2
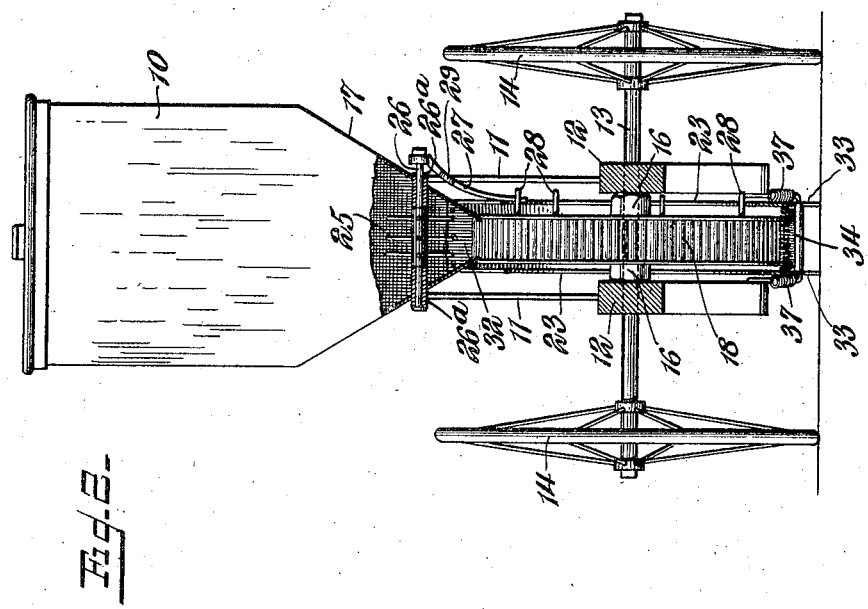
WITNESSES  
Charles H. Ourand  
E. N. Lovewell
INVENTOR  
Melvin Allison  
BY  
ATTORNEY Patented Nov. 18, 1924.

1,515,987

UNITED STATES PATENT OFFICE.

MELVIN ALLISON, OF DECORAH, IOWA.

DEVICE FOR MARKING ATHLETIC FIELDS.

Application filed September 17, 1923. Serial No. 663,290.

*To all whom it may concern:*

Be it known that I, MELVIN ALLISON, a citizen of the United States, residing at Decorah, in the county of Winneshick and State of Iowa, have invented a new and useful Device for Marking Athletic Fields, of which the following is a specification.

This invention relates to a marking device adapted to be used for marking tennis courts, base ball grounds and the like by means of lime or other material, which is distributed from a container as the latter is moved along the line to be marked.

The general object of the invention is to provide suitable mechanism by which the marking material may be accurately and uniformly applied, under all conditions, as the marker is advanced over the field.

The invention includes a positively driven feed drum partially housed within a casing close to the ground, in combination with an agitator keeping the material in the receptacle in contact with the drum, a brush for insuring the complete and uniform delivery of the material from the drum to the ground, and suitable shields for effectively preventing the dissipation of the material in the event that the wind is blowing when the marking is done.

The invention consists further in certain details of construction and combinations of parts which will be more fully explained in the following detailed description taken in connection with the accompanying drawings, which illustrate the preferred form of the invention.

In the drawings:

Figure 1 is a side elevation of the invention.

Figure 2 is a front view, partly in elevation and partly in section.

Figure 3 is a side view partly in elevation and partly in section, showing the agitator and feed drum with the housing detached.

Figure 4 is a detail sectional view showing the relation of the feed drum, delivery mouth and brush.

The device which embodies my invention includes a receptacle or hopper 10 for carrying a supply of lime, this hopper being supported by suitable braces 11 from a frame 12, which is normally inclined upwardly, and extends a sufficient distance to provide a handle by which the marker may be propelled. An axle 13 is journaled in the lower portion of the frame, and has supporting wheels 14 secured to its ends. A feed drum 15 is secured by suitable means to the central part of the axle 13 as by means of nuts 16, which may be threaded to the axle.

The lower portion of the hopper 10 is tapered as at 17, and extends into close proximity to the periphery of the drum 15, so that as the latter rotates the lime is slowly fed to the corrugated periphery 18 of the drum, the corrugations providing pockets to receive the lime. The peripheral portion of the drum 15 is snugly enclosed by an annular housing, which is preferably composed of front and rear sections 19 and 20. These sections have complementary upper ends 21 which surround the lower tapered end 17 of the hopper, and may be secured thereto in any suitable manner, and suitable ears 22 may be provided for securing the housing to the frame 12. The lower ends of sections 19 and 20 have downwardly extending flanges 24, which unite to form a delivery mouth for the lime, which is continuously fed from the hopper by the corrugated surface 18 of the feed drum. The housing sections also have inwardly extending flanges 23, which enclose the outer portion of the sides of the drum.

In order that the lime in the hopper may be maintained in constant contact with the feed drum, an agitator 25 is located within the lower part of the tapered portion 17. This agitator, as shown in Figures 2 and 3, consists of a series of radial fingers secured to a rock shaft 26 journaled in suitable bearings 26ᵃ, and provided with an actuating arm 27 extending into the path of a series of pegs 28 arranged on the drum 15, and adapted to deliver a series of sharp blows to the arm 27 as the drum rotates. The arm 27 is also provided with an opening 29 to which are secured equalizing springs 30 and 31 extending in opposite directions and suitably secured to the frame, and adapted to restore the arm 27 to its normal position whenever it is displaced by the pegs 28 traveling in either direction.

The amount of lime delivered to the drum, and the uniform delivery thereof, is regulated by means of a rubber wiper 32 secured to the mouth of the tapered portion 17 of the hopper. The delivery mouth formed by the flanges 24 at the lower ends of the housing sections is also provided with a rubber extension 33, which extends into contact with the surface of the ground and prevents the lime from being blown or scattered by the wind.

A brush 34, within the delivery mouth, is held yieldingly in contact with the corrugated surface 18, so that the lime is prevented from adhering thereto even though the same may contain considerable moisture. This brush is carried by a yoke 35, which is pivoted to the lower end of the frame 12 and extends through a slot 36 formed in the rubber flap 33 and extending into the edge of one of the flanges 24. The brush is held in yielding contact with the drum by means of springs 37, which connect the sides of the yoke to the frame 12.

By means of this invention rapid and uniform marking of the field or court is possible under all conditions. The agitator 25 keeps the material constantly stirred, and prevents the same from clogging even though it is in a damp and lumpy condition, and insures its constant contact with the revolving drum. The rubber wiper 32 regulates the flow, and prevents any excess from entering the corrugations, and insures a constant and uniform rate of delivery; and the lime is prevented from adhering to the drum by means of the brush 34. The rubber flap 33 forms a shield, so that the lime is laid properly on the ground before it can be scattered by the wind.

While I have shown and described specifically the structure of one form in which the invention may be embodied, it is to be understood that this is merely illustrative, and that many modifications may be made therein without sacrificing any of the basic principles of the invention as defined in the appended claims.

What is claimed is:

1. In a marker for athletic fields, the combination of a rotary drum, a housing partially enclosing the drum, a hopper having an outlet in proximity to the upper surface of the drum, an agitator mounted within the hopper, and means actuated by the rotation of the drum for moving the agitator.

2. In a marker for athletic fields, the combination of a rotary drum, a housing partially enclosing the drum, a hopper having an outlet in proximity to the upper surface of the drum, an agitator within the hopper, a rock shaft on which the agitator is secured, and means intermitently operable by the rotation of the drum to rock said shaft 3. In a marker for athletic fields, a wheel supported frame, a drum rotatable mounted within the frame, a housing suported by the frame and enclosing the peripheral portion of the drum, a hopper having an outlet in proximity to the upper surface of the drum, an agitator within the hopper, a rock shaft on which the agitator is secured, a series of pegs secured to the side of the drum, an arm secured to the rock shaft intermittently engageable by successive pegs to rock the shaft as the drum is rotated, and means for restoring the shaft to its initial position as soon as it is released from the respective pegs.

4. A marker comprising a frame, a wheeled axle journaled in the frame for supporting the same, a drum secured to the axle and having a corrugated periphery, a housing partially enclosing the drum, a hopper having an outlet in proximity to the upper surface of the drum, an agitator mounted within the hopper, means actuated by the rotation of the drum for moving the agitator, and a flexible wiper secured to the outlet and in contact with the periphery of the drum to regulate the feed of the material thereto.

5. In a marker for athletic fields, the combination of a rotatable drum, a housing partially enclosing the drum, a hopper having an outlet in proximity to the upper surface of the drum, said drum having a corrugated periphery, and a flexible wiper secured to the outlet of the hopper and in contact with the periphery of the drum to regulate the feed of the material thereto.

6. A marker, comprising a wheel supported drum, a hopper having an outlet in proximity to the upper surface of the drum, a housing partially surrounding the drum and having an outlet near the ground, and a flexible shield extending from the housing around the outlet into contact with the ground to prevent scattering of the material by the wind.

7. A marker comprising a rotatable drum supported near the ground, a hopper having an outlet in proximity to the upper surface of the drum, a housing partially surrounding the drum and the hopper outlet and having an outlet near the ground, a flexible flap surrounding the housing outlet and extending into contact with the ground to prevent scattering of the material by the wind, and a brush within the housing outlet yieldably held in contact with the periphery of the drum.

8. A marker comprising a frame, a wheeled axle journaled in the frame, a drum secured centrally of the axle, a hopper having an outlet in proximity to the upper surface of the drum, a housing partially surrounding the drum and adapted to receive material from the hopper, said housing having an outlet near the ground, a yoke pivoted to the frame, a brush carried by the yoke within the housing outlet, and spring means holding the yoke with the brush forming a yielding contact with the periphery of the drum.

9. In a marker for athletic fields, the combination of a frame, a drum rotatably mounted in the frame, a housing surrounding the periphery of the drum and having a slotted outlet near the ground, a yoke pivoted to the frame and extending through the slot, a brush carried by the yoke within the housing outlet, and spring means connecting the yoke to the frame to hold it yieldingly in said slot with the brush in contact with the periphery of the drum.

10. A marker comprising a rotatable drum, a wheeled frame for supporting the same, said drum having a corrugated periphery and communicating with the hopper, a housing for the periphery of the drum having an outlet, a brush within the outlet, and means for holding the brush in contact with the corrugated periphery of the drum.

11. In a marker, the combination of a wheeled frame, a drum supported thereby having a corrugated periphery, an annular housing composed of two sections surrounding the periphery of the drum, a hopper having connection with the drum and said sections, the housing sections having inwardly extending flanges closing the sides of the drum and downwardly extending flanges forming a delivery mouth, and a rubber extension engaging the downwardly extending flanges and adapted to contact with the surface of the ground.

12. In a marker, the combination of a wheeled frame, a hopper for containing the marking material, a drum mounted on the wheeled frame and having its periphery formed with corrugations, and a brush yieldingly held in engagement with said corrugations.

In testimony that I claim the foregoing as my own, I have hereto affixed my signature.

MELVIN ALLISON.